Nov. 12, 1935.                J. PICK                2,020,571
                            SOD TREATER
                         Filed Aug. 20, 1934
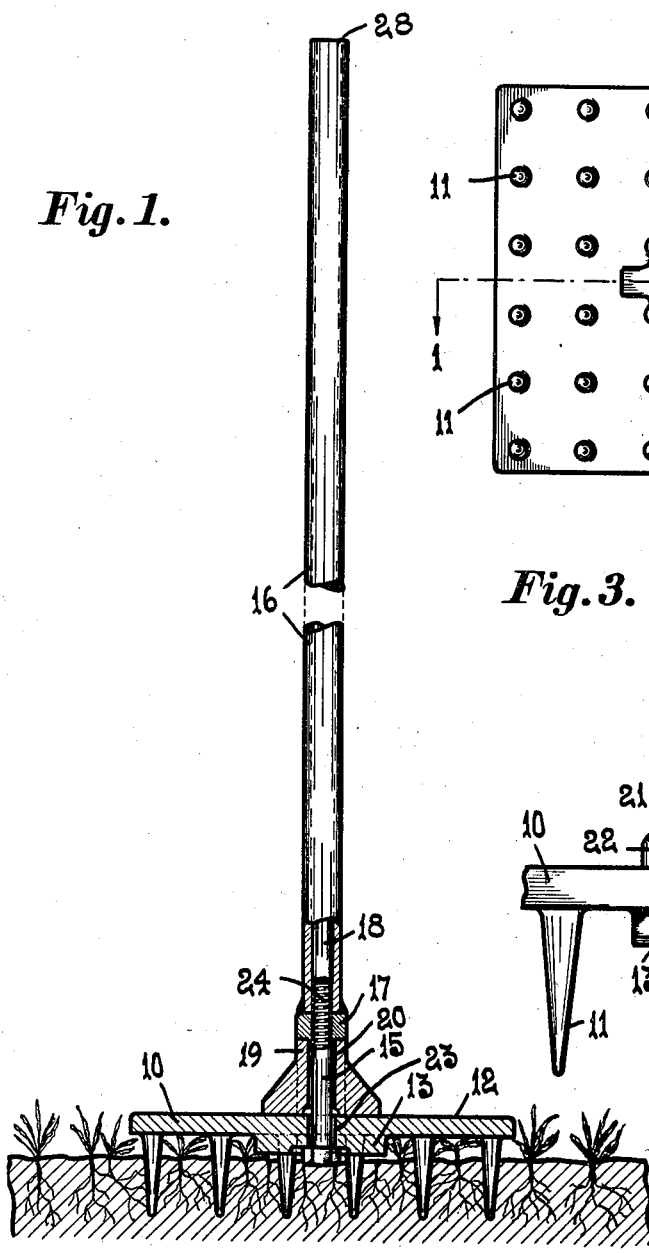
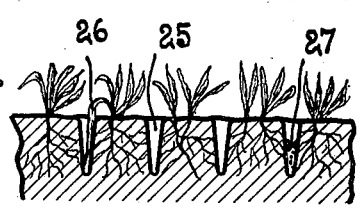
Inventor
Joseph Pick
By Arthur H. Sturges
Attorney Patented Nov. 12, 1935

2,020,571

UNITED STATES PATENT OFFICE 2,020,571

SOD TREATER

Joseph Pick, Carter Lake, Iowa

Application August 20, 1934, Serial No. 740,640

3 Claims. (Cl. 47—57)

This invention relates to the art of gardening and more particularly to a tool for vitiating or improving the condition of the sod of lawns adjacent dwellings, golf greens and the like.

It is an object of the invention to provide a tool for aerating the root stratum of sod grasses while simultaneously depositing humus material for use in conjunction with water of imbibition or substantially the maximum amount of water which said stratum can absorb and hold to nitrify and perform nutritive functions by causing the grass roots to assimilate or take in and utilize food substances for promoting growth of healthy lawn grass.

Substantially as heretofore practiced in the art lawn mowers or the like utilized to shorten the height of grass, deposit a certain amount of humus material upon the top of the soil which requires an appreciable length of time to decompose and a major portion of said substance fails to reach the roots of the grasses or sod in an advantageous manner and the invention also contemplates the provision of a tool particularly well adapted for forcing humus material into the sod and depositing same adjacent the roots thereof in a manner whereby it will more readily decompose and its valuable chemical elements be placed closely adjacent the absorbing roots of grass.

Also as heretofore practiced in the art upon applying water to lawn-sod, the water has partially evaporated with attendant waste thereof or flows from higher portions of the lawn and concentrates on low portions thereof, whereby the latter receives a surplus and unnecessary amount of water and the former receives an inadequate or lack of supply thereof, and it is an object of the invention to provide means for facilitating the forming of recesses in the sod for catching and detaining water upon all portions of the lawn for the accomplishment of the above mentioned objects while the water simultaneously carries humus material to the roots of the grasses for a nutrification and an advanced degree of vitiation thereof.

Other and further advantages of the invention will be obvious from the following detailed description.

In the practice of the method, among other elements, a tool particularly described herein may be advantageously employed, said tool being illustrated in the accompanying drawing in which:

Figure 1 is a vertical view partly in section of the tool and showing its application to sod, the view being taken on the line 1—1 of Figure 2.

Figure 2 is a bottom plan view of the new tool.

Figure 3 is a view on an enlargement scale showing partly in elevation and partly in section a fragment thereof.

Figure 4 is a diagrammatic illustration showing the manner in which the tool forces downwardly into recesses provided by the use of the new tool humus material such as blades of grass and grass clippings.

Referring now to the drawing for a more detailed description of the new tool which is particularly well adapted to function in conjunction with the practice of the method, said tool includes a mass of sufficient weight in conjunction with the later mentioned parts for forcing parts thereof into the ground without undue manual muscular exertion, said mass or plate being preferably rectangular in plan as shown in Figure 2 and provided with outwardly extending members 11 which are integral therewith.

A plurality of the members 11 are employed and preferably 36 thereof aligned and arranged in a plurality of rows preferably equi-distantly spaced from each other, as shown in Figure 2. As best shown in Figure 3, the members 11 are each of elongated substantially truncated conical shape, the frustrums thereof preferably terminating in arcuately shaped ends 11', said members being preferably circular in cross section and tapering in contour from their bases outwardly to their ends for purposes later described. The bases of the cones are joined to a common surface of the plate and extend outwardly therefrom at a right angle. The surface 12 of the mass-member or plate 10, disposed opposite to the conical-members 11, is formed flat for purposes later mentioned.

Centrally positioned with respect to the members 11, the plate 10 is provided with an integral boss 13 of cruci-form in plan, the medial portion thereof being provided with a recess of hexagonal shape for receiving therein and holding thereby against rotation the similarly shaped head 14 of an elongated cap screw 15, the threaded shank of the latter removably locking therewith an operating handle 16 and in cooperation with later described elements maintaining said handle disposed at a true right angle with respect to said surface 12 of the plate or frame.

The handle 16 may be of any adequate length and preferably extends to or slightly above the average height of an adult's shoulder at times when the tool is positioned upon the ground, the outer surface of said handle being provided with an adequate degree of smoothness for facilitating operation in the hands of an operator as later described and provided with a bore extending its entire length.

A threaded nut 17 is welded as at 17' to one end of the handle 16 and in effect for some purposes provides a continuation thereof, its threaded opening being disposed in axial alignment with the bore 18 of the handle. A vibration dampening member 19 is positioned between the nut 17 and the surface 12 of the mass and provided with a bore 20 and also disposed in axial alignment with the bore 18 of the handle, said bore 20 being of slightly greater diameter than the shank of the cap screw 15 within which the latter is snugly received.

The member 19, as best shown in Figure 3, is provided with outwardly and downwardly extending equi-distantly spaced abutments 21, preferably four thereof being employed, each being provided with a flat surface 22 adapted to firmly engage against the surface 12 of the mass and it will be understood that when the parts are assembled, as shown in Figure 1, the abutments 21 are placed in register above the arms of the cruci-form lug 13 of the mass or disc 10.

The disc 10 is provided with an aperture 23 centrally disposed with respect to said recess 14 whereby an operator may position the cap screw 15 through said aperture and cause the mass to become removably and operatively engaged with the other parts of the foregoing mentioned instrumentality by causing an engagement between the interior annular thread of the nut 17 and the threads 24 of the bolt or cap-screw 15 by rotating the one upon the other and in order to insure a firm contact between the abutments 21 and the surface 12 of the mass a wrench is applied to the nut 17 whereby when the separable parts are firmly engaged, as thus described, the abutments 21 will function to dampen vibration incident to the use of the tool as later described and maintain the handle 16 at a right angle with respect to the said surface 12 at all times.

The mass 10 together with all of the heretofore described members are preferably formed of iron for the purpose of providing an adequate amount of weight, strength and rigidity and it will be noted that the cap screw 15 is sufficiently long to provide a portion thereof received in an adequate length of the bore 18 of the handle 16 after passing through the nut 17 whereby the portion received in said bore will bear snugly against the annular wall thereof for cooperation with said abutments for preventing swinging movements of the handle 16 with respect to the mass.

In operation the new tool is lifted above the ground and caused to plunge downward by releasing the same, whereby the handle 16 will slide through the hands of the operator or in instances where hardened conditions of the soil are encountered the operator may manually apply additional pressure to the handle 16, whereby pluralities of elongated recesses such as or similar to the recesses indicated at 25 in Figure 4 are provided in the sod stratum, said recesses being of substantially the same shape and contour of the members 11, the tool being moved to a new location and the operation repeated.

It will be noted that on account of the tapered conical shape of the members 11 together with their rounded terminal ends that said members may be readily forced into the ground during which humus material will be caused to enter the interstices or recesses 25 such as the blade of grass 26 being bent or carried downwardly therein, or fragments of crushed grass or grass clippings such as indicated at 27, said grass clippings provided incident to operating a lawnmower over the area being treated and prior thereto. Also it will be noted that on account of said conical shape of the members 11 they may be easily lifted from said recesses.

After a selected area has been treated as above described the handle 16 may be disconnected from the plate 10 and reconnected thereto upon the opposite side thereof, respective abutments 21 being placed directly in contact with the terminal ends of oppositely disposed arms of the cruci-form boss whereupon the device then may be used, functioning as a tamper for further treatment of the sod. When so assembled, as last described, the member 19 also functions to space the nut 17 above the cones 11 whereby a wrench may be readily applied to said nut for connecting the parts together.

It should be noted that, during the operation of said tool for forming recesses in the sod for purposes such as mentioned, in raising the tool from its ground engaging position it should be raised vertically whereby the uprooting of the sod will be obviated such as would be occasioned should the tool be tipped and raised in an inclined position with respect to a vertical plane thereby causing the members 11 to tear the sod and the rigid construction and interfitting of the parts as described insures that the same may be consumated by preventing swaying movements of the handle with respect to the mass.

The tool may also be used for scarifying bare surfaces of ground preparatory to planting grass seed and when used for said purpose the interstices or recesses 25 are formed slight in depth by substantially lowering the tool upon the ground for providing slight depressions therein for detaining grass seed which otherwise would become washed or blown into low surfaces of the area treated to the exclusion of the higher surfaces thereof and by this means an even application of grass seed may be provided.

For the purpose of watering trees the handle 16 together with its fixed nut 17 is removed and a nipple employed for coupling the hose to the nut for supplying water under pressure within and through the bore 18 whereupon the open end 28 of the handle 16 may be inserted into the ground adjacent tree or shrub roots, the pressure of the water providing a substantially self-sinking lance without the employment of muscular effort other than to guide the lance whereby water is supplied to deep growing roots of shrubs and the like.

In the practice of the method the above particularly described tool is of advantage especially during drouth periods when the surface of the ground, or grass structure is hardened incident to the exposure thereof to the sun's rays and an attendant evaporation of moisture.

Preferably the lawn-sod surface to be treated is first provided with an application of water spread thereover for softening the same although this step may be omitted in accordance with the condition of the sod, incident to drouth.

The tool is applied to the sod, the operator grasping the handle and reciprocating the tool vertically whereby during down strokes thereof the cones 11 are caused to engage deeply in the sod for providing recesses of a substantial contour and shape of the cones and of a depth substantially equal to the major portion of their length, whereby grass clippings or humus material is carried into said recesses and also, as illustrated in Figure 4, blades of grass are bent downwardly into or portions thereof forced into said interstices, this step of the operation being repeated over other parts of the area until the whole area to be treated is provided with said recesses and said material deposited therein for a subsequent reception of and cooperation with the water of imbibition.

The next step is to provide the said area with water which may be consummated by any suitable means such as the employment of a hose connected to a suitable source of water supply and it will be understood that the water upon filling the said interstices will not only provide the roots with necessary water but will also cause a certain amount of sediment comprised of soil and water to be washed into the said recesses and form a deposit commingled with or covering said comminuted humous material whereby the latter readily becomes decomposed and provides humus.

While the ground is still soft from the application of water the cone carrying surface of the new tool may be reversed with respect to the handle thereof for providing a flat surface whereby said area may, by tamping, partially close said recesses for sealing the water against evaporation incident to exposure to the elements as well as also leveling and smoothing said area which is of particular advantage on golf greens. A comparatively light tamping is sufficient, in accordance with conditions, for permitting aeration.

I claim:—

1. A device for forming in the root stratum of sod recesses and simultaneously receiving therein humus material, comprising a plate, a plurality of elongated spaced apart conical members joined at their bases to one surface of the plate, each member extending outwardly therefrom at a right-angle, a long hollow operating handle having a fixed nut on its lower end, a bolt removably extending through the plate in a direction opposite to the members and having a threaded upper end engaging through said nut for connecting the handle to the plate, said handle also having a plurality of radiating abutments on its lower end for engagement with the plate to hold the handle firmly thereto and for positioning between the conical members when the plate is reversed.

2. A sod treating tool comprising a plate having a plurality of long conical projections thereon spaced apart at one side of the plate and said plate having a central opening therethrough, a hollow handle having a threaded nut on its lower end and provided with radial abutments below the threaded nut, and a bolt detachably engaged through the opening in the plate with its head engaging one side of the plate and having a threaded portion engaging through said nut and into the handle for detachably anchoring the handle to the plate, said abutments adapted to engage the plate to rigidly hold the same on the headed end of the bolt.

3. A sod treating tool, comprising a plate having at one side a plurality of spaced long tapering projections adapted to enter the ground and provided at its central portion with an opening through the plate and with a bearing boss about said openings with projections extending between the adjacent tapering projections of the plate, a handle having an internally threaded nut on its lower end and provided with a plurality of radiating abutments below the nut, and a removable bolt extending through the opening in the plate and having a threaded end engaging in said nut to bind the handle to the plate, and engage the abutments against the adjacent side of the plate, said abutments adapted to seat on said projections of the boss when the plate is assembled in reversed position on the bolt and handle.

JOSEPH PICK.